United States Patent
Schiebel et al.

(10) Patent No.: US 7,669,917 B2
(45) Date of Patent: Mar. 2, 2010

(54) BEARING STRUCTURE OF A MOTOR VEHICLE

(75) Inventors: Dieter Schiebel, Korntal-Münchingen (DE); Andrea Lippold, Stuttgart (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 12/127,500

(22) Filed: May 27, 2008

(65) Prior Publication Data

US 2008/0290695 A1 Nov. 27, 2008

(30) Foreign Application Priority Data

May 24, 2007 (DE) .................. 10 2007 024 172

(51) Int. Cl.
*B62D 25/20* (2006.01)
(52) U.S. Cl. .............. 296/187.01; 296/204; 296/203.04
(58) Field of Classification Search ............ 296/203.04, 296/204, 181.4, 187.01
See application file for complete search history.

(56) References Cited

U.S. PATENT DOCUMENTS

| | | | | |
|---|---|---|---|---|
| 5,018,780 A | * | 5/1991 | Yoshii et al. | 296/203.04 |
| 5,829,824 A | * | 11/1998 | Yamamuro et al. | 296/204 |
| 6,015,183 A | * | 1/2000 | Vlahovic | 296/204 |
| 2007/0284914 A1 | | 12/2007 | Schiebel et al. | |

FOREIGN PATENT DOCUMENTS

| | | |
|---|---|---|
| DE | 198 08 392 A1 | 3/1999 |
| DE | 102004019750 A1 | 12/2005 |
| DE | 10 2006 014 979 A1 | 10/2007 |
| EP | 0995666 A1 | 4/2000 |
| EP | 1840005 A1 | 10/2007 |

OTHER PUBLICATIONS

European Search Report dated Jun. 4, 2008.

* cited by examiner

*Primary Examiner*—Dennis H Pedder

(57) ABSTRACT

A bearing structure of a motor vehicle has at least two opposite node elements. Each of the node elements has at least one longitudinal beam segment and one transverse beam connection. A transverse beam joins the transverse beam connections to each other. A profiled transverse beam segment emerges from each transverse beam connection. The transverse beam segments are joined together by a glue connection in an overlap segment, and at least one open beam profile is set thereon to form the transverse beam.

6 Claims, 2 Drawing Sheets

BEARING STRUCTURE OF A MOTOR VEHICLE

CROSS-REFERENCE TO RELATED APPLICATION

This application claims the priority, under 35 U.S.C. § 119, of German application DE 10 2007 024 172.2, filed May 24, 2007; the prior application is herewith incorporated by reference in its entirety.

BACKGROUND OF THE INVENTION

Field of the Invention

The invention is based on a bearing structure of a motor vehicle. The bearing structure has at least two opposite node elements, each of which has at least one longitudinal beam segment and one transverse beam connection. A transverse beam joins the transverse beam connections to each other.

A bearing structure of this kind is known from published, non-prosecuted German patent application DE 198 08 392 A1. The bearing structure has several node elements, two of which lie opposite each other and form a pair of node elements in the fore carriage. Each node element has at least one longitudinal beam segment, to which at least one longitudinal beam can connect in one direction, here, for example, oriented to the front. Moreover, each node element of the pair has a transverse beam connection, lying opposite each other and being joined together by a transverse beam placed thereon. The transverse beam is configured as a single-piece, closed hollow profile. In the area of the hind carriage, another pair of node elements can be disposed, and they can be joined together by another transverse beam—like the front node elements. Between the two pairs of node elements, side rails can be disposed on the outer side, and additional longitudinal beams can be disposed inwardly in the area of the floor assembly.

A bearing structure of a motor vehicle appears in a recent publication by a common assignee being German patent application 10 2006 014 979, which describes one node element on each side of the vehicle in the hind carriage, also known as a longitudinal beam element. Between the two node elements, a transverse beam extends across the center tunnel, being configured as a profile open on one side, which is closed by an extension of the node element. The elements of the bearing structure can be joined together by gluing, riveting, especially stamping and riveting, and/or welding.

BRIEF SUMMARY OF THE INVENTION

It is accordingly an object of the invention to provide a bearing structure of a motor vehicle that overcomes the above-mentioned disadvantages of the prior art devices of this general type, which is optimized.

With the foregoing and other objects in view there is provided, in accordance with the invention, a bearing structure of a motor vehicle. The bearing structure contains at least two opposite node elements each having at least one longitudinal beam segment and one transverse beam connection and profiled transverse beam segments each emerging from one of the profiled transverse beam connections. The profiled transverse beam segments are joined together by a glue connection in an overlap segment of the profiled transverse beam segments. At least one open beam profile is disposed on the profiled transverse beam segments and together form a transverse beam. The transverse beam joins the transverse beam connections to each other.

The primary benefits achieved with the invention are that the bearing structure is optimized in its rigidity both in the transverse direction and when exposed to torques thanks to the optimized transverse beam between the two node elements. Furthermore, the bearing structure of the invention, especially for a lightweight configuration, can be assembled in an especially easy manner, which is achieved in particular by the glue connection between the two transverse beam segments according to the invention. Moreover, the bearing structure of the invention enables an equalization of the tolerances of the dimensions in the lengthwise and transverse direction of the vehicle.

The rigidity of the bearing structure can be further improved with a reinforcement structure configured as a truss structure with differently oriented or same oriented cross pieces and ribs. Especially preferred, however, is a configuration of the transverse beam segments with rib structures, which besides their reinforcing attribute can also provide for a large-area glue connection. Preferably the rib structures and/or the reinforcement structures are made as solid profiles or as embossed beads.

Other features which are considered as characteristic for the invention are set forth in the appended claims.

Although the invention is illustrated and described herein as embodied in a bearing structure of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
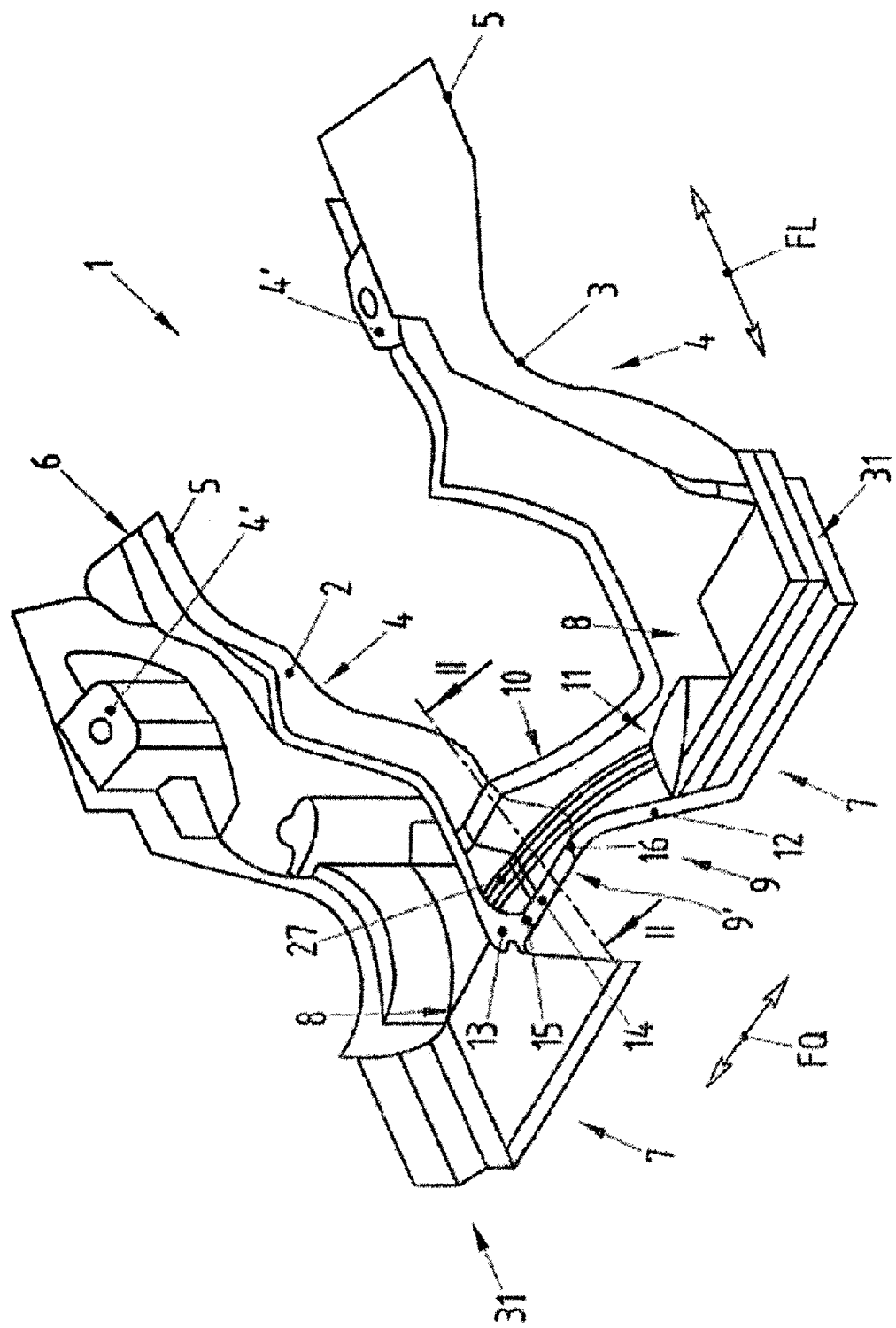
FIG. 1 is a diagrammatic, simplified, cut-away perspective view of a bearing structure of a motor vehicle according to the invention.

Referring now to the figures of the drawing in detail and first, particularly, to FIG. 1 thereof, there is shown a cutout view of a bearing structure 1 of a motor vehicle, not otherwise depicted. The bearing structure 1 has side node elements 2, 3 of a hind carriage shown opposite each other and forming a pair of node elements. Each node element 2, 3 has a longitudinal beam segment 4, running in a longitudinal direction FL of the vehicle, and a seat 6 for a non-illustrated rear longitudinal beam at its rear end 5. At the opposite, front end 7, each node element 2 has an outward lying, but inward directed transverse beam segment 8, which can extend as far as a center tunnel 9. Between the rear end 5 and the front end 7, the longitudinal beam segment 4 has a wheel case contour with a shock strut gudgeon 4'. Between the two outer transverse beam segments 8 of the node elements 2, 3 lies yet another inner transverse beam segment running in a transverse direction FQ of the vehicle, hereinafter known as the transverse beam 10. The transverse beam 10 is connected to inner transverse beam connections 11, which emerge from the transverse beam segments 8 and point upward. The transverse beam segments 11 can be configured as arches, at least partly following the trend of the center tunnel 9, or they can extend across the center tunnel 9.

In the sample embodiment shown, transverse beam segments 12 and 13 that are profiled in cross section are attached to the transverse beam connections 11 as a single piece, lying one on top of the other in an overlapping segment 14. The transverse beam connections 11 and the transverse beam segment 12 and 13 can each be configured as a separate component. However, in a preferred embodiment, each transverse beam connection 11 and the transverse beam segment coordinated with it, 12 or 13, are realized as a continuous component and configured preferably as a single piece with the corresponding outer transverse beam segment 8, as is depicted in FIG. 1. Furthermore, it is preferably provided that each node element 2, 3 be configured as a single piece with the corresponding segments, namely, the transverse beam segment 8, the transverse beam connection 11, the transverse beam segment 12 or 13 and the longitudinal beam segment 4 with shock strut gudgeon 4', being a light metal cast piece.

Figures 2, 3:
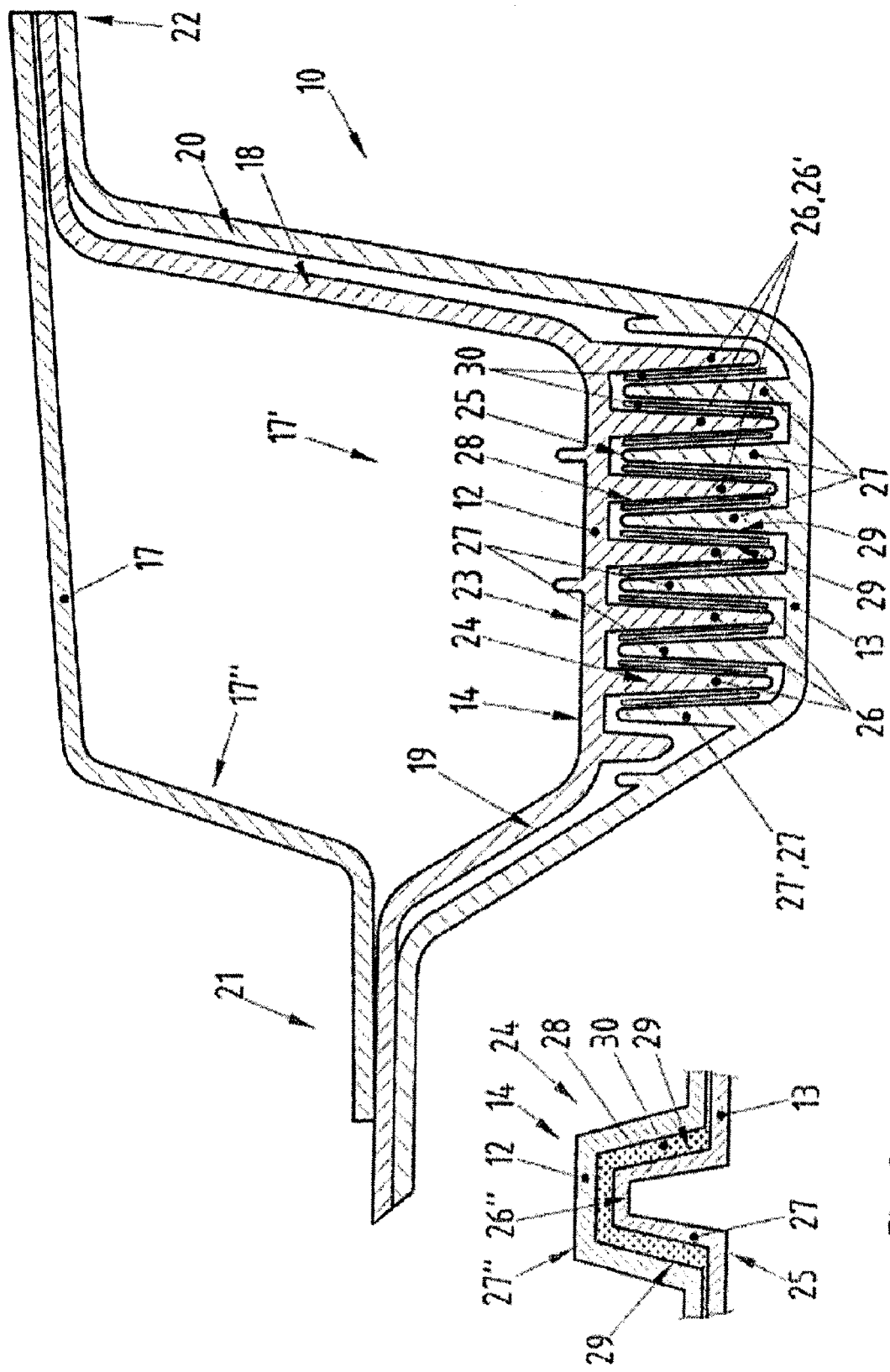
FIG. 2 is a diagrammatic, sectional view taken along the line II-II shown in FIG. 1 of a reinforcing structure according to a first embodiment.
FIG. 3 is a diagrammatic, cross-sectional view of the reinforcing structure according to a second embodiment.

The transverse beam segment 12 reaches by its end 15 roughly as far as the transverse beam connection 11 of the opposite node element 2. The same holds for the transverse beam segment 13 with its end 16, indicated by hatch marks. To complete the transverse beam 10—as shown in FIG. 2—yet another open beam profile 17 is placed on the transverse beam segments 12 and 13, thus forming a bottom shell 17', and connected so that a closed hollow profile 18 is formed, one which is compound in cross section, as the transverse beam 10. The transverse beam segments 12 and 13 are preferably of U-shaped profile in their cross section, so that a compound U-profile is formed with legs lying on top of each other, which can constitute two pairs of legs 19 and 20 with a different height. The open beam profile 17 is suitably adapted to this in cross section, in particular, it is bent 17", as is clearly seen in FIG. 2. Thus, ends 21 and 22 of the closed hollow profile 18 that form the flanges can be joined together, for example, by gluing and/or metal forming seams and/or welding.

Reinforcement structures 24 and 25 directed toward each other and preferably in a single piece emerge from a base 23 of the transverse beam segments 12 and 13 forming the U-shaped profile, each reinforcement structure 24 and 25 preferably having several ribs 26 and 27 running parallel to each other at a spacing, being oriented at least in the transverse direction FQ of the vehicle, as is indicated for the ribs 27 in FIG. 1. Thus, the two reinforcement structures 24 and 25, being so configured as rib structures with stiffening attributes, mesh with each other in the manner of a comb, so that between every two neighboring ribs 26 of the reinforcement structure 24 there is a rib 27 of the other reinforcement structure 25, and vice versa. For a permanent and rigid connection of the two transverse beam segments 12 and 13, especially in the overlap region 14, a glue connection 28 is provided, wherein side walls 29 of the ribs 26 and 27 in particular are provided with a glue layer 30 on one or both sides. Furthermore, the glue connection 28 could also extend into the region of the pair of legs 19 and/or 20 or as far as the ends 21 and 22.

In the sample embodiment shown per FIGS. 2 and 3, the reinforcement structures 24 and 25 and in particular the ribs 26 and 27 are configured as a single piece with the respective transverse beam segment 12 or 13, although the reinforcement structures 24 and 25 could also in theory be realized as separate components that are joined to the respective transverse beam segment 12 or 13. According to FIG. 2, the reinforcement structures 24 and 25 and especially the ribs 26 and 27 are configured as a solid profile 26' and 27'; alternatively, or possibly alternatingly, closed hollow profiles could be specified for this.

If one chooses, it would be possible—as shown by FIG. 3—to emboss the reinforcement structures 24 and 25 so that riblike structures are formed, i.e., to provide them with beads 26" and 27" by a forming process, so that these mesh like a comb—as already described. In a broader sense, the reinforcement structures 24 and 25 could be configured with any given cross section almost like a corrugated sheet and engaging with each other. In FIG. 3, the cross section of the beads 26" and 27" is trapezoidal; alternatively, it could be triangular, semicircular, semioval or the like. The just described cross sections for the beads 26" and 27" could similarly be provided with ribs 26 and 27 (FIG. 2). Otherwise, the same or equivalent parts in FIG. 3 are provided with the same references as used in the other FIGS. 1 and 2.

The overlap segment 14 in the sample embodiment is confined roughly to a central tunnel roof 9' of the center tunnel 9, i.e., the top lying segment of the transverse beam segments 12 and 13. Alternatively, however, the overlap segment 14 between the ends 15 and 16 (FIG. 1) could be configured shorter or longer than shown and extend, for example, into the regions of the transverse beam connections 11, i.e., it could reach approximately as far as the transverse beam segments 8. Furthermore, at reference 31, a so-called side sill (not shown) can adjoin from the outside the outward lying transverse beam segment 8. Accordingly, the transverse beam segments 8 which are open at the top or have closure elements not shown here and the transverse beam 10, lined up in a row, form a continuous beam between two side sills of the bearing structure 1, which can be connected to a front pair of non-illustrated node elements. Furthermore, a non-illustrated floor of the bearing structure 1 can adjoin the end 7, which can include a structure prolonging the center tunnel 9.

The invention claimed is:

1. A bearing structure of a motor vehicle, the bearing structure comprising:
    at least two opposite node elements each having at least one longitudinal beam segment and one transverse beam connection;
    profiled transverse beam segments each emerging from one of said profiled transverse beam connections, said profiled transverse beam segments being joined together by a glue connection in an overlap segment of said profiled transverse beam segments, said profiled transverse beam segments having rib structures emerging from said profiled transverse beam segments in said overlap segment and mesh together like a comb; and
    at least one open beam profile disposed on said profiled transverse beam segments and together forming a transverse beam, said transverse beam joining said transverse beam connections to each other.

2. The bearing structure according to claim 1, wherein said profiled transverse beam segments have reinforcement structures in said overlap segment, said reinforcement structures including said rib structures.

3. The bearing structure according to claim 2, wherein said reinforcement structures are each configured as one of a solid profile and as embossed beads.

4. The bearing structure according to claim 1, wherein said rib structures are each configured as one of a solid profile and as embossed beads.

5. The bearing structure according to claim 2, wherein said reinforcement structures are glued together.

6. The bearing structure according to claim 1, wherein said rib structures are glued together.

* * * * *